US012756671B2

(12) United States Patent
Fultaria et al.

(10) Patent No.: US 12,756,671 B2
(45) Date of Patent: Oct. 6, 2026

(54) MANAGING TRANSPORTATION OF PACKETS ACROSS MULTIPLE CLUSTERS WITHIN A NoC

(71) Applicant: Baya Systems, Inc., Santa Clara, CA (US)

(72) Inventors: Jatinkumar Vithalbhai Fultaria, Bengaluru (IN); Om Prakash Hari, Bengaluru (IN); Honnahuggi Harinath Venkata Naga Ambica Prasad, Bengaluru (IN); Narayana Sri Harsha Gade, Bangalore (IN); Eric Norige, Santa Clara, CA (US)

(73) Assignee: BAYA SYSTEMS, INC., Santa Clara, CA (US)

( * ) Notice: Subject to any disclaimer, the term of this patent is extended or adjusted under 35 U.S.C. 154(b) by 196 days.

(21) Appl. No.: 18/793,271

(22) Filed: Aug. 2, 2024

(65) Prior Publication Data

US 2025/0373564 A1 Dec. 4, 2025

(30) Foreign Application Priority Data

May 30, 2024 (IN) ............................ 202411042146

(51) Int. Cl.
*H04L 47/41* (2022.01)
*G06F 15/78* (2006.01)

(52) U.S. Cl.
CPC .......... *H04L 47/41* (2013.01); *G06F 15/7825* (2013.01)

(58) Field of Classification Search
CPC ....... G06K 19/06112; G06K 19/06037; G06K 7/1417; G06F 3/0482; G06F 3/0484; H04W 12/08; G16H 10/60; G16H 30/20
(Continued)

(56) References Cited

U.S. PATENT DOCUMENTS

2013/0308444 A1* 11/2013 Sem-Jacobsen ...... H04L 47/125 370/242
2017/0005735 A1* 1/2017 Li ........................ H04B 10/503
(Continued)

OTHER PUBLICATIONS

Z. Lu, L. Xia and A. Jantsch, "Cluster-based Simulated Annealing for Mapping Cores onto 2D Mesh Networks on Chip," 2008 11th IEEE Workshop on Design and Diagnostics of Electronic Circuits and Systems, Bratislava, Slovakia, 2008, pp. 1-6 (Year: 2008).*
(Continued)

*Primary Examiner* — Taylor A Elfervig
(74) *Attorney, Agent, or Firm* — Procopio, Cory, Hargreaves & Savitch LLP

(57) ABSTRACT

Method for transporting packets in a multi-cluster Network on Chip (NoC) interconnect with a transport protocol significantly enhance packet management in complex NoC chip architectures. This approach involves processing a packet within clusters to determine a destination cluster and a destination node, and executing a node lookup for the packet intended for different clusters. This lookup identifies an optimal path for transporting the packet out of the cluster. The multi-cluster NoC interconnect efficiently outlines cluster-to-cluster connections and manages global traffic, incorporating deadlock prevention techniques. Global bridges and boundary bridges facilitate effective traffic management between clusters. Each node includes a programmable path table that dynamically assigns efficient routes. This method significantly improves packet management across multi-cluster NoCs, offering a scalable, efficient, and reliable solution for complex computing environments.

20 Claims, 7 Drawing Sheets

100A

100B

(58) Field of Classification Search
USPC .......................................................... 709/205
See application file for complete search history.

(56) References Cited

U.S. PATENT DOCUMENTS

| | | | | |
|---|---|---|---|---|
| 2017/0351555 | A1* | 12/2017 | Coffin | G06F 9/5083 |
| 2019/0258572 | A1* | 8/2019 | Rowlands | H04L 49/15 |
| 2019/0361770 | A1* | 11/2019 | Geng | G06F 11/1004 |
| 2022/0004439 | A1* | 1/2022 | Abraham | G06F 9/5066 |

OTHER PUBLICATIONS

T. Karadeniz, L. Mhamdi, K. Goossens and J. J. Garcia-Luna-Aceves, "Hardware design and implementation of a Network-on-Chip based load balancing switch fabric," 2012 International Conference on Reconfigurable Computing and FPGAs, Cancun, Mexico, 2012, pp. 1-7 (Year: 2012).*

M. Koibuchi, K. Anjo, Y. Yamada, A. Jouraku and H. Amano, "A Simple Data Transfer Technique Using Local Address for Networks-on-Chips," in IEEE Transactions on Parallel and Distributed Systems, vol. 17, No. 12, pp. 1425-1437, Dec. 2006 (Year: 2006).*

* cited by examiner

MANAGING TRANSPORTATION OF PACKETS ACROSS MULTIPLE CLUSTERS WITHIN A NoC

CROSS-REFERENCE TO RELATED APPLICATIONS

This application claims priority to IN 202411042146, filed on May 30, 2024, the contents of which are incorporated herein by reference.

BACKGROUND

Technical Field

Methods and example embodiments described herein are generally directed to a multi-cluster Network on Chip (NoC), and more specifically, to transporting packets across multiple clusters interconnected within the NoC.

Related Art

The number of components on a chip is rapidly growing due to increasing levels of integration, system complexity, and shrinking transistor geometry. Complex System-on-Chips (SoCs) may involve a variety of components e.g., processor cores, Digital Signal Processors (DSPs), hardware accelerators, memory, and Input/Output (I/O) interfaces, while Chip Multi-Processors (CMPs) may involve a large number of homogenous processor cores, memory and I/O subsystems. In both systems, the on-chip interconnect plays a key role in providing high-performance communication between the various components. Due to scalability limitations of traditional buses and crossbar-based interconnects, Network-on-Chip (NoC) has emerged as a paradigm to interconnect a large number of components on the chip.

NoC is a global shared communication infrastructure made up of several routing nodes interconnected with each other using point-to-point physical links. Messages are injected by source components and are routed from the source components to a destination component through multiple intermediate nodes and physical links. Typically, the source component injects into the NoC using a source bridge. The NoC transports the packet to a destination bridge which ejects the message from the NoC and provides it to destination component. For the remainder of the document, terms 'processing elements,' 'components,' 'blocks,' 'hosts,' or 'cores,' will be used interchangeably to refer to the various system components which are interconnected using a NoC. Without loss of generalization, the system with multiple interconnected components will itself be referred to as a 'multi-core system'.

There are several possible topologies in which the routers can connect to one another to create the system network. Bi-directional rings 100A (as shown in FIG. 1A) and 2-D mesh 100B (as shown in FIG. 1B) are examples of topologies in the related art.

Packets are message transport units for intercommunication between various components. Routing involves identifying a path which is a set of routers and physical links of the network over which packets are sent from a source to a destination. Components are connected to one or multiple ports of one or multiple routers; with each such port having a unique identifier (ID). Packets carry the destination's router and port ID for use by the intermediate routers to route the packet to the destination component.

Examples of routing techniques include deterministic routing, which involves choosing the same path from A to B for every packet. This form of routing is oblivious to the state of the network and does not load balance across path diversities which may exist in the underlying network. However, such deterministic routing may be simple to implement in hardware, maintains packet ordering, and may be easy to make free of network-level deadlocks. Shortest path routing minimizes the latency as it reduces the number of hops from the source to the destination. For this reason, the shortest path is also the lowest power path for communication between the two components. Dimension-order routing is a form of deterministic shortest-path routing in 2D mesh networks.

FIG. 2 illustrates an example of XY routing in a two-dimensional mesh 200. More specifically, FIG. 2 illustrates XY routing from node '34' to node '00'. In the example of FIG. 2, each component is connected to only one port of one router. A packet is first routed in the X dimension till the packet reaches node '04' where the x dimension is same as the destination. The packet is next routed in the Y dimension until the packet reaches the destination node.

Source routing and routing using tables are other routing options used in NoC. Adaptive routing can dynamically change the path taken between two points on the network based on the state of the network. This form of routing may be complex to analyze and implement and is therefore rarely used in practice.

NoCs may contain multiple physical networks. Over each physical network, there may exist multiple virtual networks, where different message types are transmitted over different virtual networks. In this case, at each physical link or channel, there are multiple virtual channels (VCs), each VC may have dedicated buffers at both end points. In any given clock cycle, only one VC can transmit data on the physical channel.

NoC interconnects often employ wormhole routing, where a large message or packet is broken into small pieces known as flits (also referred to as flow control digits). The first flit is the header flit which holds information about the packet's route and key message level information along with payload data and sets up the routing behavior for all subsequent flits associated with the message. Zero or more body flits follow the head flit, containing the remaining payload of data. The final flit is a tail flit which in addition to containing the last payload also performs some bookkeeping to close the connection for the message. In wormhole flow control, VCs are often implemented.

The physical channels are time-sliced into a number of independent logical channels, i.e. VCs. VCs provide multiple independent paths to route packets; however, they are time-multiplexed on the physical channels. A VC holds the state needed to coordinate the handling of the flits of a packet over a channel. At a minimum, this state identifies the output channel of the current node for the next hop of the route and the state of the virtual channel (idle, waiting for resources, or active). The VC may also include pointers to the flits of the packet that are buffered on the current node and the number of flit buffers available on the next node.

The term "wormhole" refers to the way messages are transmitted over the channels: the output port at the next router can be so short that received data can be translated in the head flit before the full message arrives. This allows the router to quickly set up the route upon arrival of the head flit and then opt-out from the rest of the conversation. Since a message is transmitted flit by flit, the message may occupy several flit buffers along its path at different routers, creating a worm-like image.

Based on the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies. However, all channels are equal in width or number of physical wires. This width can be determined based on the most loaded channel and the clock frequency of various channels.

SUMMARY

Aspects of the example implementations are directed to a method for transporting packets across clusters in a multi-cluster Network on Chip (NoC) interconnect with a transport protocol. The method includes processing, by a cluster, a packet to determine a destination cluster and a destination node. For the destination cluster being different from the cluster, the method includes executing a lookup of a node that transports the packet out of the cluster and towards the destination cluster based on a path and the destination cluster, and transporting the packet to the node from the lookup for transport to another cluster.

Additional aspects of the present disclosure are also directed towards a Network on Chip (NoC) having a plurality of clusters, wherein each of the clusters is configured to process a packet to determine a destination cluster and a destination node. For the destination cluster being different from the cluster, the cluster executes a lookup of a node that transports the packet out of the cluster and towards the destination cluster based on a path and the destination cluster, and transports the packet to the node from the lookup for transport to another cluster.

DETAILED DESCRIPTION

Figure 1A:
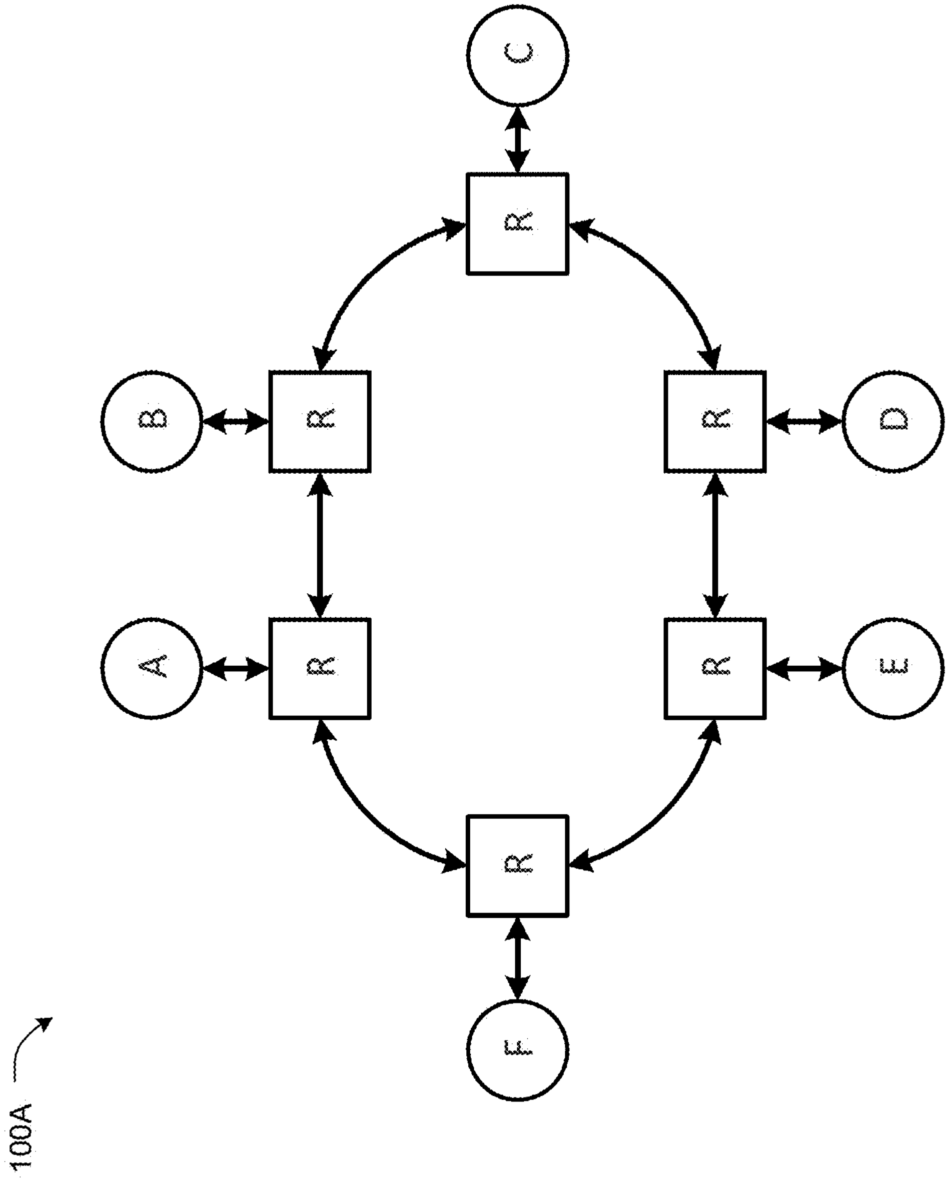
FIGS. 1A and 1B illustrate examples of Bidirectional ring and 2D Mesh Network on Chip (NoC) topologies.
Figure 1B:
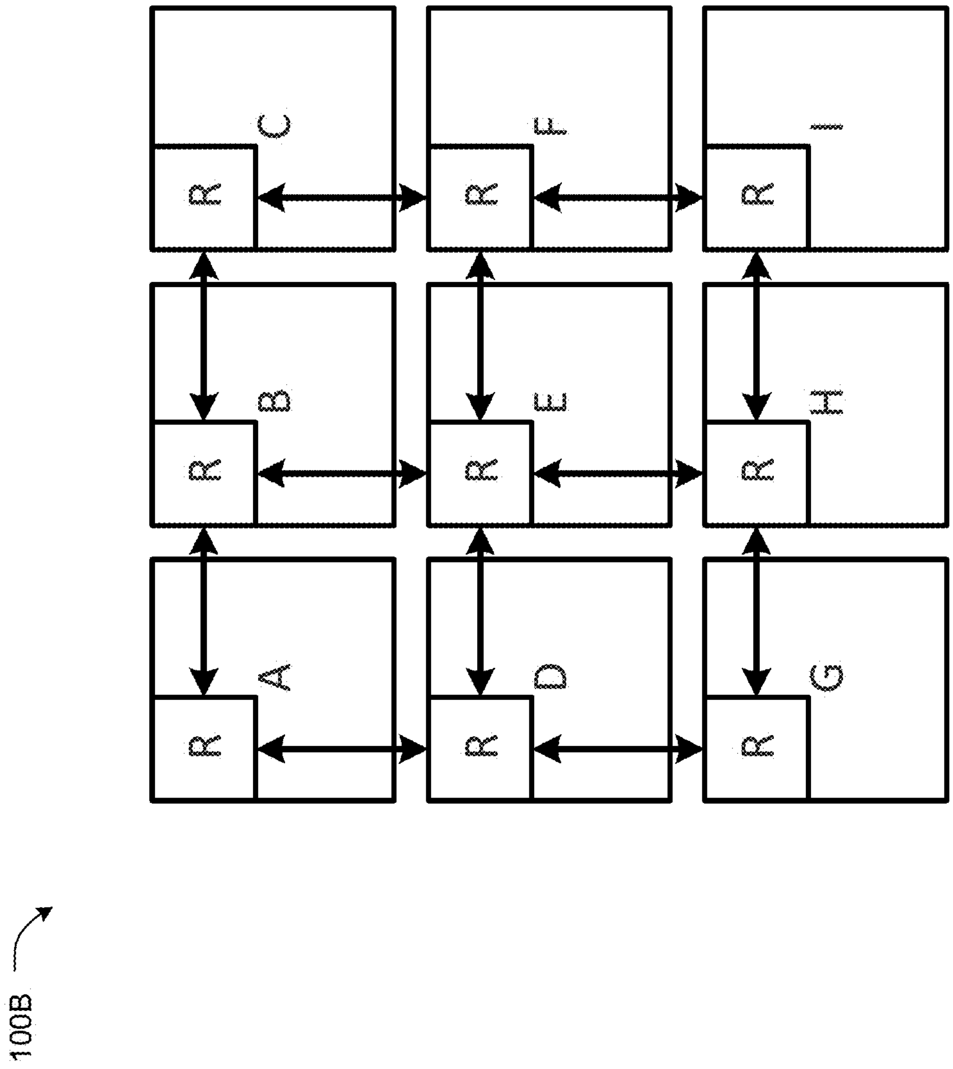
Figure 2:
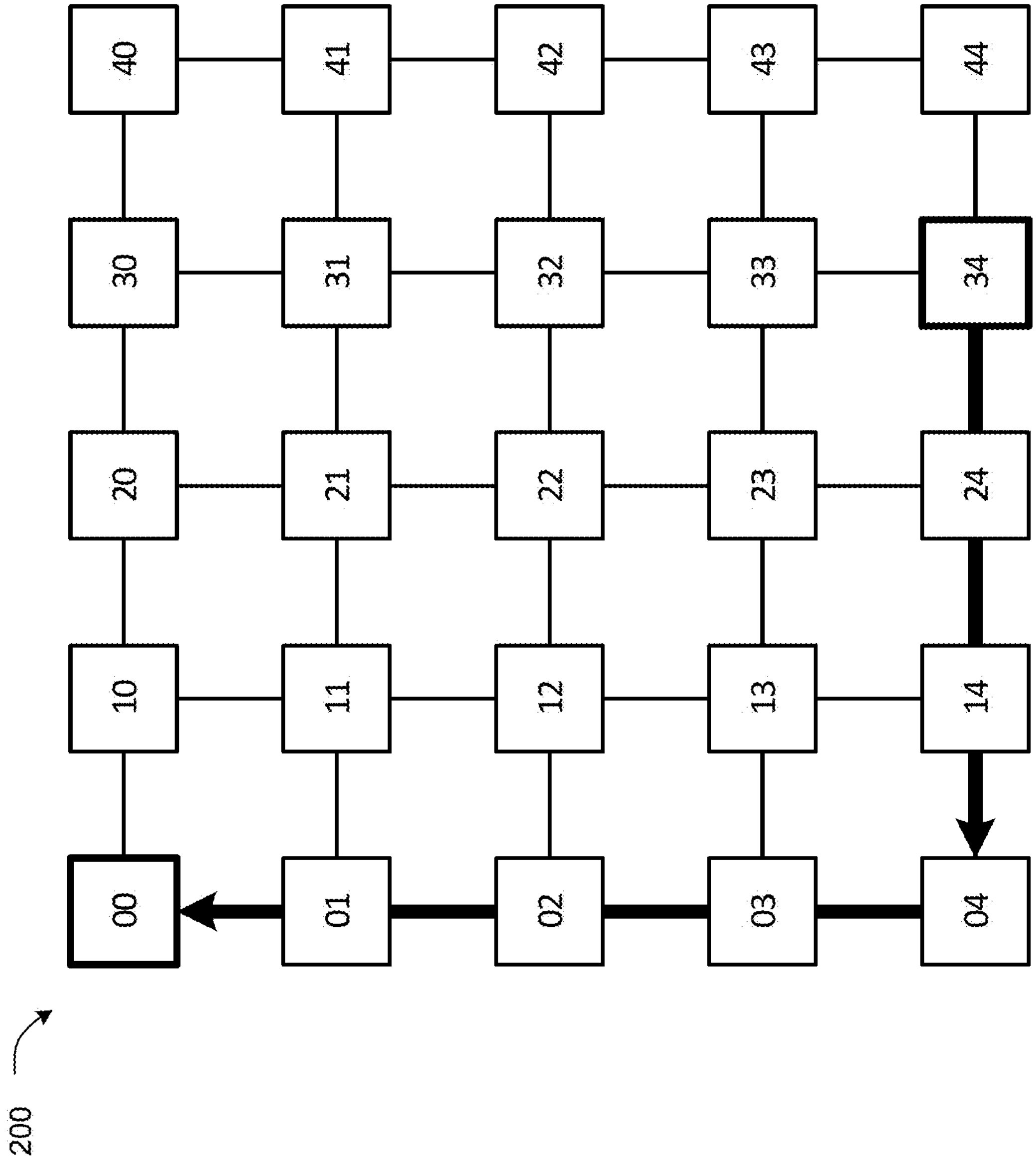
FIG. 2 illustrates an example of XY routing in a NoC having a two-dimensional mesh topology.

Complex traffic profiles in a System on Chip (SoC) or a Network on Chip (NoC) can create uneven load on various channels of an interconnect that connects various components of the SoC. Example embodiments described herein are based on the concept of transporting packets across multiple clusters within the NoC.

In conventional methods, the efficiency and performance of the NoC interconnect are significantly influenced by various factors including the rate at which components send messages, the topology of the NoC, connections of components to NoC nodes, and paths messages take within the NoC. To facilitate smooth data flow, channels within the NoC may be uniformly sized with the same number of wires to avoid the need for messages to be reformatted as the messages move through different channels. The uniform sizing is often based on the width of the most heavily loaded channel to prevent congestion. Load balancing is achieved by routing the messages away from busy paths, to distribute the load more evenly across channels. However, there is often limited flexibility in choosing the paths. This limitation is due to constraints such as the need to follow the shortest path routing, minimal turn routing, or the lack of path diversity. Therefore, in most SoCs, channels remain non-uniformly loaded, and using the highest channel load to determine the global NoC channel width leads to increased area, power, and interconnect cost.

In existing NoC architectures, transporting packets across routers presents several challenges and drawbacks. As data traffic increases, the routers can become bottlenecks, leading to delays and reduced network efficiency. This is especially problematic in complex multi-cluster systems where the data flow is high. Additionally, static routing is commonly employed in current NoCs that lack the flexibility to adapt to dynamic traffic patterns, resulting in increased latency. Another significant issue is the power consumption and heat generation associated with intense router activity, which is a critical concern in high-performance computing environments. Furthermore, in the existing NoC architectures, increased traffic raises the likelihood of data packet loss and errors. These drawbacks highlight the need for more advanced and adaptable routing, congestion management techniques, and energy-efficient designs in NoC.

Unlike the existing NoC architectures, embodiments described herein provide a method for managing data packet transmission between multiple clusters of NoC architecture. Initially, a cluster may process a data packet to determine a destination cluster and a destination node. If the destination cluster is different from the cluster, the method may include finding a node within the current cluster that may send the data packet towards the intended destination. This node is identified through a lookup process based on predetermined paths connecting the clusters. Once the node is identified, the data packet is routed to the node that transfers the data packet to the destination cluster, ensuring efficient and accurate inter-cluster communication.

Figure 3A:
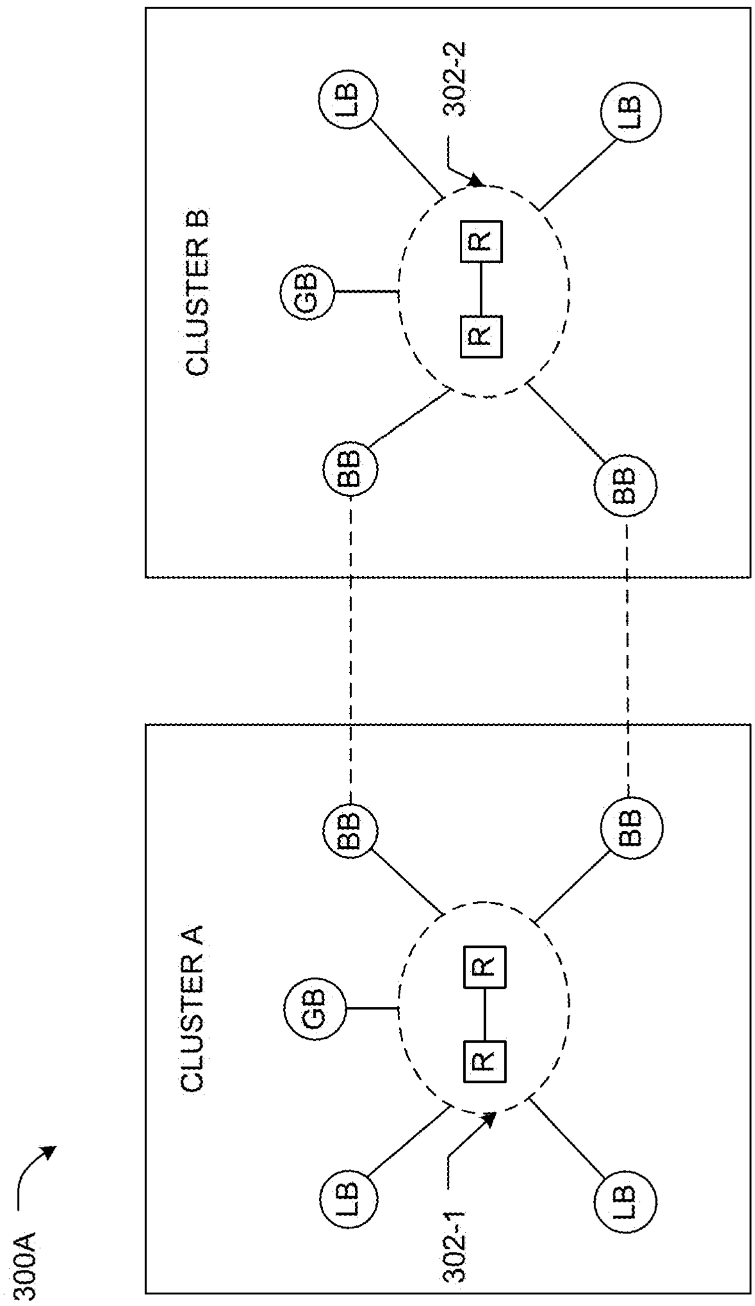
FIG. 3A illustrates a topology of a two cluster NoC, in accordance with an example implementation.

FIG. 3A illustrates a schematic representation 300A of the topology of a two-cluster NoC, in accordance with an example implementation.

Referring to FIG. 3A, a multi-cluster NoC may be interconnected with an endpoint protocol for communicating across clusters. In some embodiments, each cluster in the NoC may have components including, but not limited to processor cores/processing elements, memory modules, Input/output (I/O) controllers, buffers, the local bridges (B), the routers (R), control units and the like. The components may be elaborated to allow messages/packets to be exchanged there between. The packets may be transmitted to and from the components through nodes of the NoC, which may include routers, bridges (such as global bridges, boundary bridges, local bridges), and the like.

In some examples, the processing elements may be configured to communicate using corresponding routers. Each cluster may have a set of routers that are interconnected. The routers may communicate using transport-level connections/transport protocols. The set of routers may be configured to communicate with other clusters using bridges. The multiple clusters may exchange packets through the bridges using protocol-level connections. Use of clusters may provide the benefits of independent verification or validation of interconnections within each cluster. An independent construction of clusters in chipsets allows for easy division across dies or sockets and facilitates a reuse of design components, significantly enhancing both scalability and efficiency in advanced computing systems.

During operation of the NoC, (data) packets may be transmitted from a source cluster to a destination cluster. In some embodiments, the packet may be transported directly from the source cluster to the destination cluster. In other embodiments, the packet may be transported from the source cluster to the destination cluster through one or more intermediate clusters. Initially, a host inside the source cluster generates the packet. The host is a component that generates the packet. The source cluster may process the packet at a bridge connected to the host to determine the destination cluster and destination node in the destination cluster. The source cluster may transport the packet therefrom to the destination cluster, through zero or more intermediate clusters. Each intermediate cluster, and the destination cluster may receive the packet, and may process the packet to determine/extract the destination node and the destination cluster. The source cluster, the intermediate clusters, and the destination cluster, among other clusters, may be collectively referred to as "cluster(s)". In some examples, the source cluster may determine itself to be the destination cluster.

When the cluster determines the destination cluster to which the packet is to be transported, the clusters may determine if said cluster is the destination cluster. In some embodiments, if the cluster is the destination cluster, the destination cluster may identify the destination node, and transport the packet thereto. If the cluster is different from the destination node, the packet is transported to a node/ejection node in the cluster from which the packet can be ejected out towards another cluster that is the destination cluster, or is closer to the destination cluster. For example, cluster A (being the source cluster) in the multi-cluster NoC may process the packet and determine cluster B as the destination cluster. Once the destination cluster and the destination node are determined by the source cluster, the source cluster may determine whether it (cluster A) is different from the destination cluster (cluster B). Since cluster A is different from cluster B, the source cluster may execute a lookup for the ejection node in the source cluster that transports the packet out of the source cluster and towards the destination cluster based on a path and the destination cluster. The path may be retrieved from a table, as described subsequently.

The lookup process may determine an ejection node associated with the source cluster to reach a desired node (e.g., the destination node). The ejection node may be a node that is capable of transporting the packet from the source cluster towards the destination cluster/destination node. In an embodiment, nodes in the multi-cluster NoC may be connected to inter-cluster communication channels. For example, if cluster A needs to transport the packet to cluster B, cluster A may execute the lookup of node A1 associated with cluster A that transports the packet to cluster B/node B1 (e.g., the destination node). While the aforementioned describes an example where the source cluster (cluster A) determines the destination cluster as cluster B, in other examples, the cluster A may determine itself to be the destination cluster. In such examples, the cluster A may not perform the lookup of how to reach cluster B, and directly transport the packet to the destination node therewithin.

In further examples, the cluster A may determine destination cluster to be cluster B, and may transport the packet to cluster B through cluster C. In such examples, cluster A may perform the lookup for a node to transport the packet to another cluster (such as cluster C), which may transport the packet closer to the destination cluster. Cluster C may receive and process the packet to determine the destination cluster (such as through extraction of a cluster identifier (ID)). Cluster C may determine if it is different from the destination cluster (i.e. cluster B in this example), and perform a lookup for a node within Cluster C that can transport the packet closer to another cluster, i.e. the destination cluster 'cluster B'. When cluster B receives the packet from cluster C, cluster B may be configured to determine if it is different from the destination cluster. Since, in this example, cluster B is the destination cluster, it may transport the packet to the destination node there within. The destination node may be identified using a corresponding node identifier.

As described, each of the clusters perform a check if said clusters are different from the destination cluster, and accordingly transport the packet such that the packet reaches the destination node in the destination cluster. To determine whether the clusters are different from the destination cluster, the clusters may compare cluster ID associated with the destination cluster with that of the clusters. In case of the source cluster, the cluster ID may be identified when the source cluster determines the destination cluster and the destination node. In case of intermediate clusters, the intermediate clusters may extract the cluster ID from the packet received to determine the destination cluster. In some examples, address bits indicating the cluster ID of the destination cluster may be transported in a header associated with the packet.

In an embodiment, the destination cluster may be redefinable to adapt to an underlying topology. The clusters of the NoC may be arranged in a hierarchy or a topology. The topology may define the flow of traffic between the clusters at different levels or portions of the topology. In some examples, the destination cluster may be repurposed/reprogrammed for use in different topologies. In such examples, the cluster ID of the destination cluster may be changed. The destination cluster may be modified or adjusted according to a physical layout or logical layout (topology) of the NoC and usage patterns of the NoC.

Figure 3B:
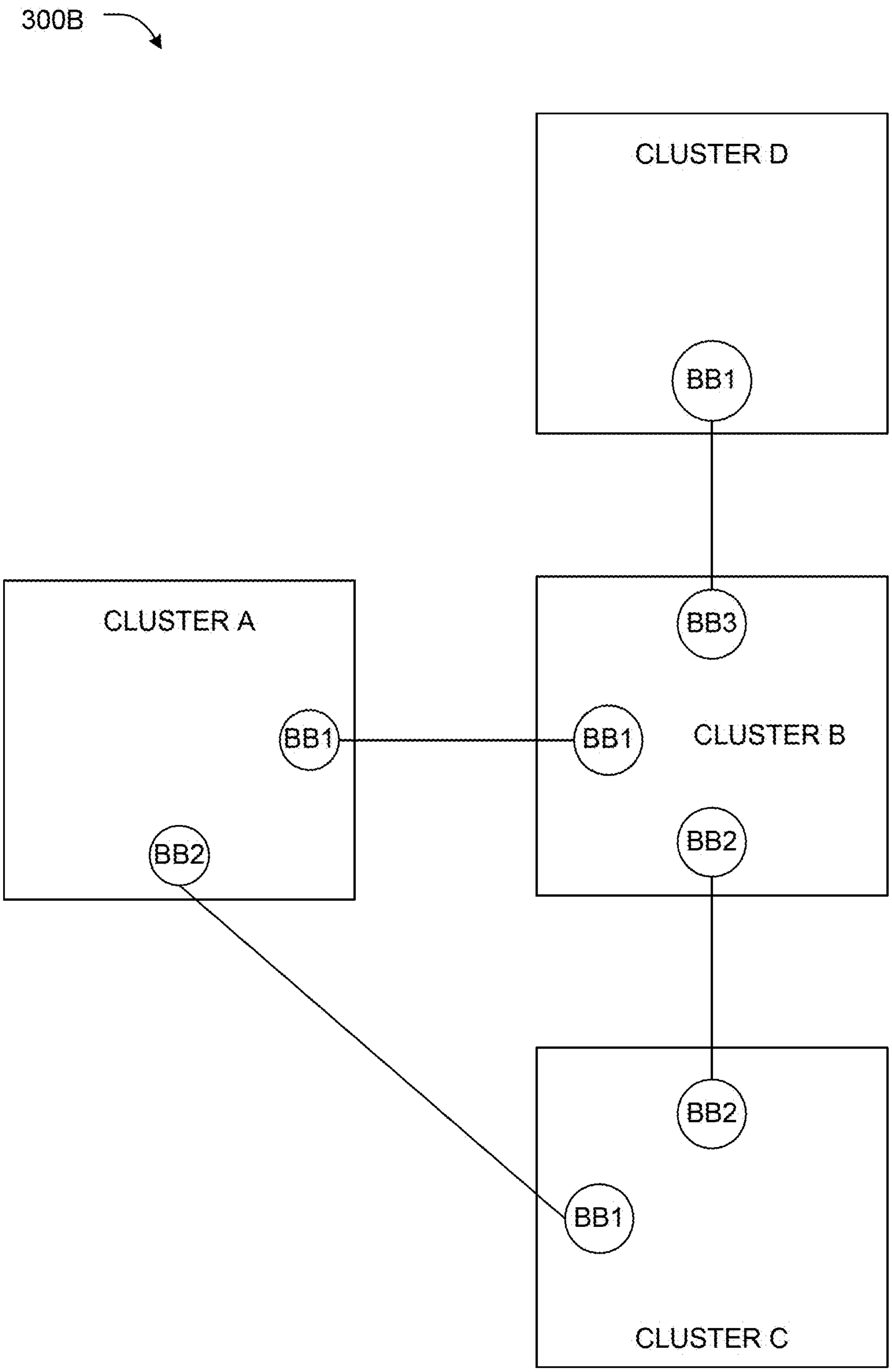
FIG. 3B illustrates a topology of a four-cluster NoC, in accordance with an example implementation.

Referring to FIG. 3B, the plurality of clusters such as cluster A, cluster B, cluster C, and cluster D are interconnected with each other by the bridges (e.g., the boundary bridges BB1, BB2, BB3, etc.). Each of the boundary bridges may be uniquely identifiable based on cluster ID of the cluster that the bridge belongs to, and the node ID associated with the boundary bridge. These boundary bridges may manage and direct the packet flow to effectively communicate the data packet from the source cluster to the destination cluster via potential intermediate clusters. For example, when cluster A serves as the source cluster from which the data packet is dispatched, and cluster D is the intended destination cluster, the data packet may be initially transmitted from cluster A to cluster B through the interlinking boundary bridges. Once cluster B receives the data packet, the data packet is then transmitted to cluster D via another boundary bridge in cluster B, thereby completing the transmission of the data packet to the appropriate destination cluster. In some examples, when cluster D serves as the source cluster and cluster C serves as the destination cluster, the data packet may be generated from cluster D and first routed to cluster B, via the corresponding boundary bridges therebetween. Subsequently, the data packet may be forwarded from cluster B to cluster C through another boundary bridge in cluster B.

In an embodiment, each node in the multi-cluster NoC may be associated with a fixed path table that defines paths between the clusters, as shown in Table. 1. Each cluster in the multi-cluster NoC may include several nodes. For example, if node A1 in cluster A needs to send the packet to the node B1 in cluster B, node A1 may access the fixed path table and identify a predefined path to from node A1 to node B1 in cluster B. The packet may follow the fixed path that interconnects cluster A and cluster B through nodes between A1 and B1. The interconnect nodes may be classified automatically as routers (R), or as bridges (B) such as global bridges, local bridges, or boundary bridges. The routers (R) may manage the transportation of the packet within the cluster. In an embodiment, the packet may refer to data, headers, and the like. The header may include the address on which this packet operates, sequence information, protocol information, and the like.

For example, the packets may be communicated from a source node in cluster A to the clusters using any of the following fixed paths:

TABLE 1

| Destination Cluster | Fixed Paths |
|---|---|
| Cluster B | BB1 of cluster A → BB1 of cluster B |
| Cluster C | BB2 of cluster A → BB1 of cluster C |
| Cluster C | BB1 of cluster A → BB1 of cluster B |
| Cluster D | BB1 of cluster A → BB1 of cluster B |

As shown in Table. 1, each row may represent a possible path from the source cluster to the destination cluster. The source cluster A may directly transport packets to some destination clusters, such as cluster B and cluster C. Other destination clusters may involve intermediate clusters which direct the packet from the source cluster to the destination cluster therethrough, such as when the destination cluster is cluster D, the packet may be transported through cluster B (i.e. the intermediate cluster). Similarly, packets may also be transported from cluster A to cluster C through cluster B. The path to the node that ejects the packet may be selected based on the fixed path.

In an embodiment, the multi-cluster NoC interconnect may be generated from a specification that defines cluster-to-cluster connections and global traffic of the multi-cluster NoC interconnect. The cluster-to-cluster connections defined in the specification may be optimized to eliminate the need for specifying end-to-end flows between every two clusters, thereby reducing the size of the routing table. In some embodiments, the specification may refer to information/configuration of a connection between the clusters. The information may pertain to number of links between the clusters, a bandwidth of each link, a type of routing protocol, and the like, but not limited thereto. The specification may also include information of global traffic patterns of the NoC. The information of global traffic patterns may include data flow between different clusters of the NoC. Based on the specification, the NoC interconnect may be generated by laying out physical connections and logical connections between the clusters. For example, if a high volume of traffic may be transported between cluster A and cluster B, the NoC architecture may include multiple high-bandwidth links between cluster A and cluster B to enhance the smooth flow. Similarly, if cluster C requires periodic communication, links for cluster C may be configured with lower bandwidth, thereby optimizing resource allocation.

In an embodiment, the specification may be processed for deadlock for the generation of the multi-cluster NoC interconnect. Deadlocks may occur between cluster-to-cluster connections. Deadlocks may be identified and resolved as the NoC clusters are constructed and integrated. Based on this configuration, the packet may be prevented from being stuck waiting for other parts of the system that are themselves stuck waiting for that packet to make progress. For example, at the same time, if cluster A is sending the packet to cluster B, cluster B is trying to send the packet to cluster C, and cluster C is attempting to send the packet to cluster A, each cluster may have to wait for the next one to free up, so in this situation, no packet moves between the cluster due to the deadlock. In some embodiments, to prevent the deadlock, the specification may involve adding extra pathways or changing the routing rules if primary routes are busy. For example, a direct route from cluster C to cluster A may be added to avoid the deadlock.

In other embodiments, deadlocks may be prevented by classifying bridges into one or more categories based on direction of transportation of the packets. In an embodiment, the multi-cluster NoC interconnect may include one or more global bridges configured to transmit and/or receive cluster-to-cluster traffic, and boundary bridges that support connections between the clusters and local bridges that only communicate with destinations inside their cluster. The global traffic that goes between clusters may be decomposed into segments by cutting at boundary bridge. This would produce three kinds of segments: global bridge to boundary bridge, boundary bridge to boundary bridge, and boundary bridge to global bridge. The global bridge to boundary bridge may be used for traffic leaving the cluster, and boundary bridge to global bridge may be used for traffic entering the cluster. Boundary to boundary bridge may be used for pass-through traffic. Pass-through traffic may be packets that pass indirectly from a first cluster to a second cluster via one or more intermediate clusters. Limiting the number of boundary to boundary traffic while constructing the cluster will help prevent deadlocks. In other instances, isolating global bridge to boundary bridge traffic onto a separate layer/virtual channels from boundary bridge to global bridge traffic can prevent transitive dependencies between boundary bridges that could cause system level deadlocks.

For example, in FIG. 3A, global bridges are represented by ‘GB’, boundary bridges are represented by ‘BB’, and local bridges as ‘LB’ within a circle. Further, set of routers 302-1 and 302-2 in cluster A and B respectively form the transport core of the clusters. Each router in the set of routers 302-1, 302-2 are represented by ‘R’ within a square. The set of routers 302-1, 302-2 may allow for communication within the clusters, such as between two nodes or bridges of the clusters. In an example, if cluster A manages graphics processing and cluster B manages Artificial Intelligence (AI) computations, cluster A may send the packet to cluster B through the global bridge. In some embodiments, entry and exit of the packet from each cluster to the global bridge may be managed by the boundary bridge. For example, when cluster A sends a packet to cluster B, the packet first passes through the cluster A’s egress boundary bridge and into cluster B’s ingress boundary bridge before reaching the destination global bridge. In an embodiment, the packet from cluster B may be transmitted from a global bridge in cluster B. The packet may be transported from the global bridge to a boundary bridge of cluster B for ejection, and then caused to enter cluster A via a boundary bridge. In some embodiments, the path may be determined along with determination of the destination cluster. In such embodiments, the packet may include address bits of the destination cluster (such as in the header of the packet) indicating the path selected for transporting the packet from the source to the destination cluster. In other embodiments, the path may be used to transport the packet based on load balancing or redundancy. In such embodiments, the path may be selected dynamically based on load balancing or redundancy protocols. For example, the path may be dynamically adjusted as a function of address bits of the destination cluster, and one or more parameters pertain to the load or traffic in paths leading up to the destination cluster.

In some embodiments, the path may be defined from flow splicing from the source cluster of the packet to the destination cluster. For example, if boundary bridges between cluster A (e.g., the source cluster) and cluster B (e.g., the destination cluster) are busy, but the bridges between cluster A to cluster C and cluster C to cluster B is less busy, the traffic may direct to take an alternate route (e.g., cluster A to cluster C to cluster B). This configuration may enable the load balancing across the multi-cluster NoC. In some embodiments, if any of the bridge between cluster A and cluster B becomes faulty, the packet may take the alternate route to transport the packet between cluster A and cluster B.

In some embodiments, if cluster A (e.g., the source cluster) needs to transmit a single large packet to cluster D (e.g., when it is the destination cluster), instead of transmitting as a whole packet through one bridge or path, the packet may split into multiple packets, and the multiple packets may be transported along different paths or bridges to avoid congestion. Once the multiple packets reach cluster D, the split packets may be reassembled.

In an embodiment, each node in the multi-cluster NoC may manage a programmable path table that associates each of the clusters with an associated path. While the fixed path table (such as Table 1) includes a list of paths that can be used for transporting the packet out of the cluster, the clusters that are associated with the fixed paths may be programmable, in the programmable path table. The programmable path table may include information of the path to reach the desired destination. In an embodiment, the programmable path table may be updated in response to adding new clusters, traffic patterns, and the like. In some examples, when the design/topology of the NoC is changed/redefined, or due to factors including, but not limited to, traffic congestion, and the like, the path for transporting the packet out of the source cluster towards the destination cluster may be changed. In such instances, the destination cluster may be associated with a different path in the programmable path table. For example, cluster C may be reachable from cluster A directly through BB2, or indirectly through BB1 (wherefrom BB1 of cluster B receives the packet, which in-turn transports the packet from BB2 of cluster B to BB2 of cluster C). In some examples, the direct path may be determined to be a preferred path and the indirect path may be determined to be an alternative path. The preferred path may be a default path under normal traffic condition. The alternative path may be a backup path that is used when the preferred path is congested, unavailable or less optimal due to changing NoC conditions. Initially, for nodes in cluster A, cluster C may be associated with the path "BB2 of cluster A □ BB1 of cluster C". In some situations, due to traffic conditions, programmable path table may change the association of cluster C to the path "BB1 of cluster A □ BB1 of cluster B", such that the packet is transported from source cluster A to destination cluster C through cluster B. The programmability of the path table may allow for dynamic change in routing decisions, based on real-time data about NoC traffic, faults, or other operational parameters. This adaptability may enhance in managing variable data traffic and maintaining high efficiency in a multi-cluster NoC environment.

Figure 4:
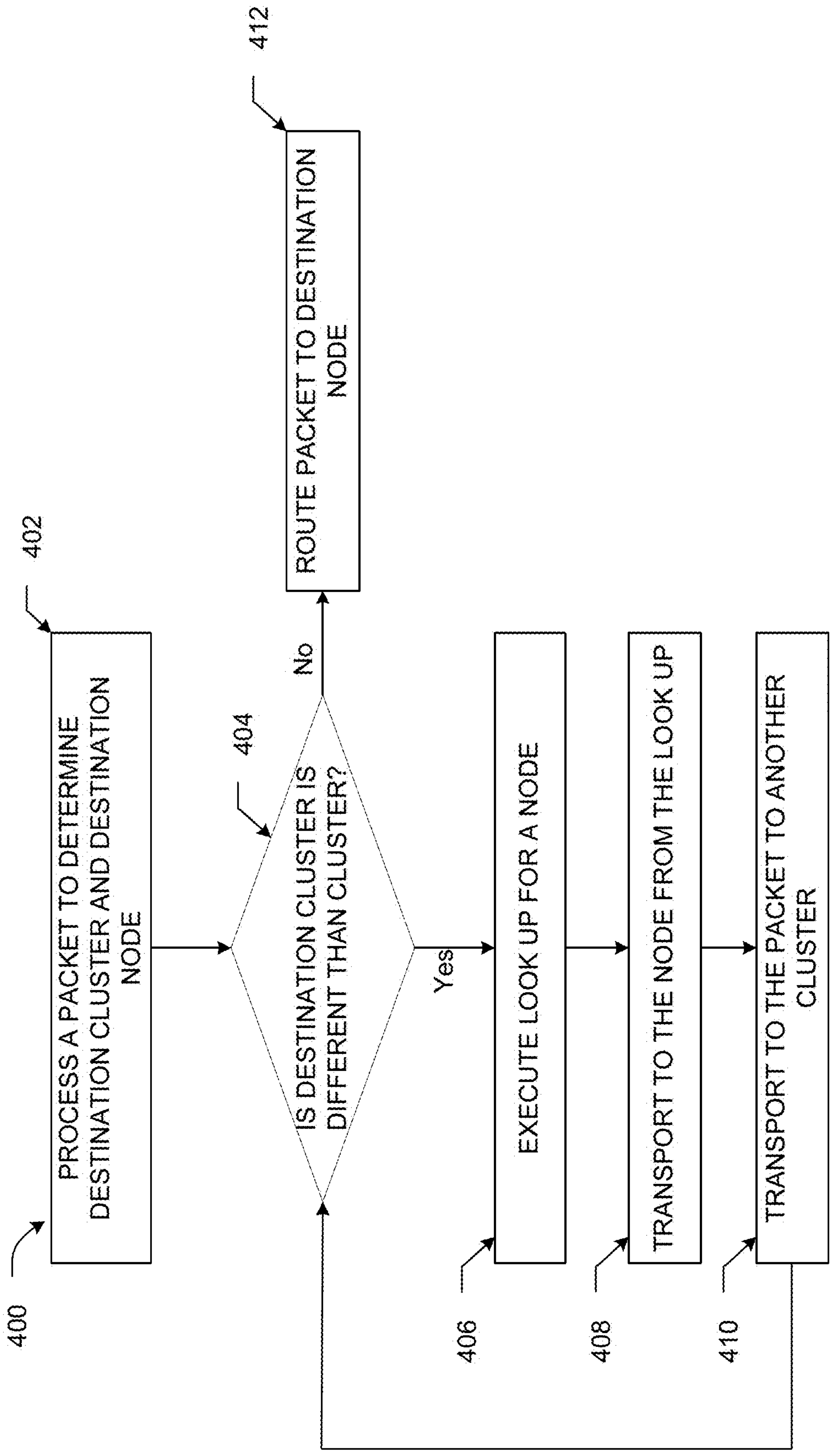
FIG. 4 illustrates a flowchart of a method for transporting the packet across the multiple clusters in the NoC, in accordance with an example implementation.

FIG. 4 illustrates a flowchart of a method 400 for transporting the packet across the multiple clusters in the NoC, in accordance with an example implementation.

Referring to FIG. 4, at 402, the method 400 may include processing, by a cluster, a packet to determine a destination cluster and a destination node. The packet may be processed when it is received from either the host or another cluster through corresponding bridge. At 404, the method 400 may include determining if the destination cluster is different from the cluster. If yes, at step 406, the method 400 may include executing a lookup of a node that transports the packet out of the cluster and towards the destination cluster based on a path and the destination cluster. At 408, the method 400 may include transporting the packet to the node from the lookup for transport to another cluster. At step 410, the method 400 includes transporting the packet to another cluster, and returning to step 404. Steps 404 to 410 are iterated until the cluster is the destination cluster. When the destination cluster is not different (i.e. same) as the cluster processing the packet, then the packet is routed to the destination node, at step 412.

In an embodiment, destination clusters are redefinable to adapt to an underlying topology. In an embodiment, nodes in the multi-cluster NoC may be associated with the fixed path table that defines paths between the clusters. In an embodiment, the multi-cluster NoC interconnect may be generated from a specification that defines cluster-to-cluster connections and global traffic of the multi-cluster NoC interconnect. In an embodiment, the specification is processed for deadlock for the generation of the multi-cluster NoC interconnect. In an embodiment, the multi-cluster NoC interconnect may include one or more global bridges configured to facilitate cluster-to-cluster traffic, and boundary bridges that are connected to a cluster, where the global traffic is defined in the specification as either global bridge to boundary bridge, boundary bridge to boundary bridge, and boundary bridge to global bridge.

In an embodiment, the path used to transport the packet is based on load balancing or redundancy. The path may be defined from flow splicing from a source cluster of the packet to the destination cluster. In an embodiment, each node in the multi-cluster NoC manages a programmable path table that associates each of the clusters with an associated path. The nodes of the interconnect are classified automatically as router, global bridge, local bridge, or boundary bridge.

Figure 5:
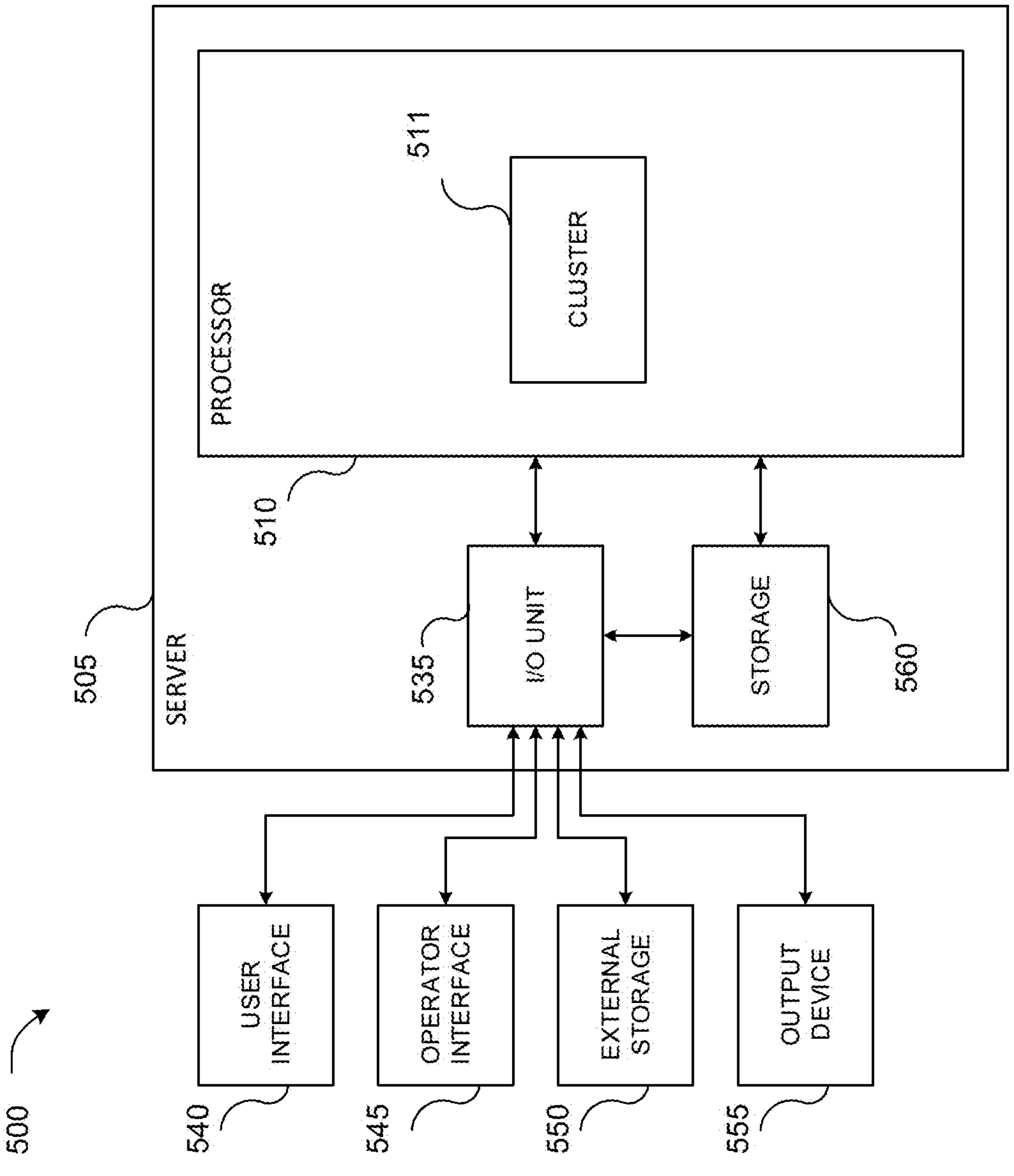
FIG. 5 illustrates a computer/server block diagram upon which the example implementations described herein may be implemented.

FIG. 5 illustrates an example computer system 500 on which example embodiments may be implemented. The computer system 500 includes a server 505 which may include an I/O unit 535, storage 560, and a processor 510 operable to execute one or more units as known to one of skill in the art. The term "computer-readable medium" as used herein refers to any medium that participates in providing instructions to processor 510 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit 535 processes input from user interfaces 540 and operator interfaces 545 which may utilize input devices such as a keyboard, mouse, touch device, or verbal command.

The server 505 may also be connected to an external storage 550, which can contain removable storage such as a portable hard drive, optical media, disk media, or any other medium from which a computer can read executable code. The server 505 may also be connected to an output device 555, such as a display to output data and other information to a user, as well as request additional information from a user. The connections from the server 505 to the user interface 540, the operator interface 545, the external storage 550, and the output device 555 may be via wireless protocols, such as the 802.11 standards, Bluetooth® or cellular protocols, or via physical transmission media, such as cables or fiber optics. The output device 555 may therefore further act as an input device for interacting with a user.

The processor 510 may be implemented as an NoC. The NoC includes one or more clusters 511 having interconnects that allow communication of packets there between. The clusters 511 that are configured to process a packet to determine a destination cluster and a destination node. For the destination cluster being different from the cluster, the cluster 511 may execute a lookup of a node that transports the packet out of the cluster and towards the destination cluster based on a path and the destination cluster and transport the packet to the node from the lookup for transport to another cluster.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example embodiments, the steps carried out require physical manipulations of tangible quantities for achieving a tangible result.

Moreover, other implementations of the example embodiments will be apparent to those skilled in the art from consideration of the specification and practice of the example embodiments disclosed herein. Various aspects and/or components of the described example embodiments may be used singly or in any combination. It is intended that the specification and examples be considered as examples, with a true scope and spirit of the embodiments being indicated by the following claims.

What is claimed is:

1. A method for transporting packets across clusters in a multi-cluster Network on Chip (NoC) interconnect with a transport protocol, comprising:

on receipt of a packet by a cluster of the clusters in the multi-cluster NoC:

processing the packet to determine a destination cluster identifier, a path, and a destination node identifier;

for the destination cluster identifier indicative of the cluster being the destination cluster, routing the packet to a node of the cluster indicated by the destination node identifier; and for the destination cluster identifier indicative of the destination cluster being different from the cluster:

using the path and the destination cluster identifier to execute a lookup of a node that transports the packet out of the cluster and towards the destination cluster; and transporting the packet to the node indicated by the lookup; and transporting the packet to another cluster of the clusters from the node indicated by the lookup.

2. The method of claim 1, wherein destination clusters are redefinable to adapt to an underlying topology.

3. The method of claim 2, wherein the nodes in the multi-cluster NoC interconnect are associated with a fixed path table that defines paths between the clusters.

4. The method of claim 1, wherein the multi-cluster NoC interconnect is generated from a specification that defines cluster-to-cluster connections and global traffic of the multi-cluster NoC interconnect.

5. The method of claim 4, wherein the specification is processed for deadlock for the generation of the multi-cluster NoC interconnect.

6. The method of claim 4, wherein the multi-cluster NoC interconnect comprises one or more global bridges configured to facilitate cluster-to-cluster traffic, and boundary bridges that are connected to the cluster, wherein the global traffic is defined in the specification as either global bridge to boundary bridge, boundary bridge to boundary bridge, and boundary bridge to global bridge.

7. The method of claim 1, wherein the path used to transport the packet is based on load balancing or redundancy.

8. The method of claim 1, wherein the path is defined from flow splicing from a source cluster of the packet to the destination cluster.

9. The method of claim 1, wherein each node in the multi-cluster NoC interconnect manages a programmable path table that associates each of the clusters with an associated path.

10. The method of claim 1, wherein nodes of the multi-cluster NoC interconnect are classified automatically as router, global bridge, local bridge, or boundary bridge.

11. A Network on Chip (NoC) interconnect, comprising:

a plurality of clusters, wherein each cluster from the plurality of clusters is configured to, on receipt of a packet:

process the packet to determine a destination cluster identifier, a path, and a destination node identifier;

for the destination cluster identifier indicative of the each cluster being the destination cluster, route the packet to a node of the each cluster indicated by the destination node identifier; and for the destination cluster identifier indicative of the destination cluster being different from the cluster:

use the path and the destination cluster identifier to execute a lookup of a node that transports the packet out of the each cluster and towards the destination cluster; and transport the packet to the node indicated by the lookup; and transport the packet to another cluster of the plurality of clusters from the node indicated by the lookup.

12. The NoC interconnect of claim 11, wherein destination clusters are redefinable to adapt to an underlying topology.

13. The NoC interconnect of claim 12, wherein the nodes in the NoC interconnect are associated with a fixed path table that defines paths between the clusters.

14. The NoC interconnect of claim 11, wherein the NoC interconnect is generated from a specification that defines cluster-to-cluster connections and global traffic of the NoC interconnect.

15. The NoC interconnect of claim 14, wherein the specification is processed for deadlock for the generation of the multi-cluster NoC interconnect.

16. The NoC interconnect of claim 14, wherein the NoC interconnect comprises one or more global bridges configured to facilitate cluster-to-cluster traffic, and boundary bridges that are connected to the cluster, wherein the global traffic is defined in the specification as either global bridge to boundary bridge, boundary bridge to boundary bridge, and boundary bridge to global bridge.

17. The NoC interconnect of claim 11, wherein the path used to transport the packet is based on load balancing or redundancy.

18. The NoC interconnect of claim 11, wherein the path is defined from flow splicing from a source cluster of the packet to the destination cluster.

19. The NoC interconnect of claim 11, wherein each node in the NoC interconnect manages a programmable path table that associates each of the clusters with an associated path.

20. The NoC interconnect of claim 11, wherein nodes of the NoC interconnect are classified automatically as router, global bridge, local bridge, or boundary bridge.

* * * * *